H. B. SHERWOOD.
SCALE.
APPLICATION FILED DEC. 21, 1909.

958,441.

Patented May 17, 1910.

Witnesses:
R. Hamilton.
M. Cox.

Inventor,
H. B. Sherwood,
By F. G. Fischer, Atty.

UNITED STATES PATENT OFFICE.

HARRY B. SHERWOOD, OF KANSAS CITY, MISSOURI, ASSIGNOR TO KANSAS CITY SCALE & SUPPLY COMPANY, A CORPORATION OF MISSOURI.

SCALE.

958,441.      Specification of Letters Patent.      Patented May 17, 1910.

Application filed December 21, 1909. Serial No. 534,270.

*To all whom it may concern:*

Be it known that I, HARRY B. SHERWOOD, a citizen of the United States, residing at Kansas City, in the county of Jackson and State of Missouri, have invented certain new and useful Improvements in Scales, of which the following is a specification.

My invention relates to improvements in scales, and the important features of the invention resides in a compensating device to automatically take up lost motion in the weighing mechanism of the scale, to the end that greater accuracy may be had than heretofore.

Figure 1:
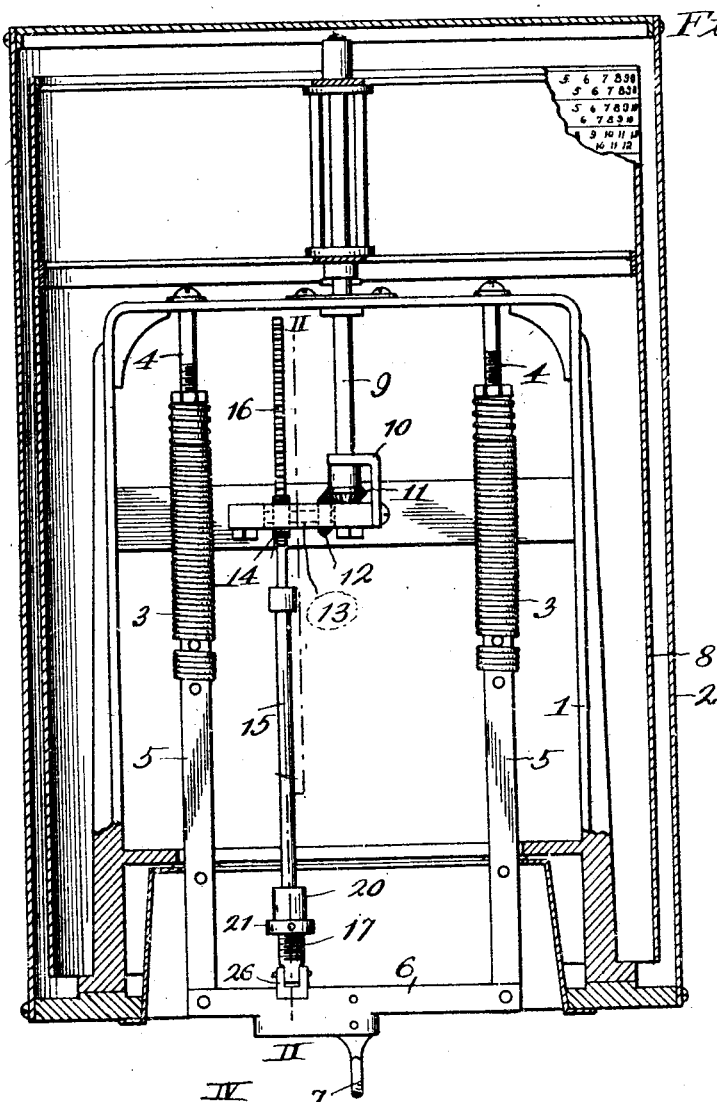
Figure 2:
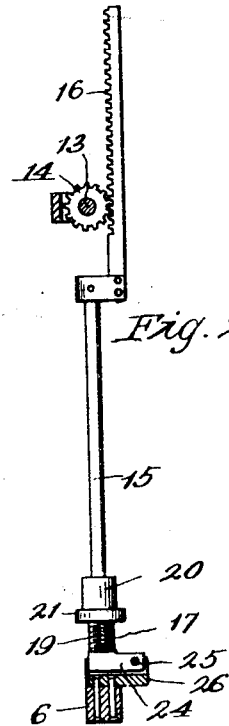
Figure 6:
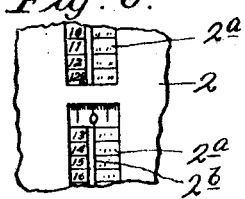
Figure 3:
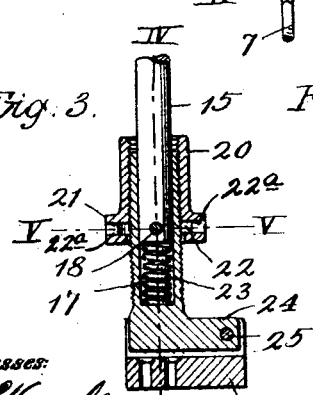
Figure 4:
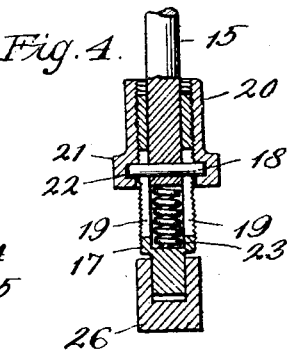
Figure 5:
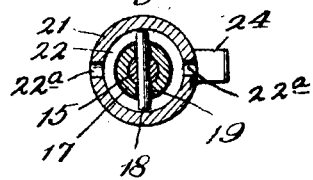

Other features of the invention will hereinafter appear, and in order that said invention may be fully understood, reference will now be made to the accompanying drawing, in which:

Figure 1 represents a vertical central section of a computing scale embodying my invention with the pan removed. Fig. 2 is a section on line II—II of Fig. 1 of part of the weighing mechanism. Fig. 3 is an enlarged vertical section of my compensating device applied to a portion of the weighing mechanism. Fig. 4 is a vertical section on line IV—IV of Fig. 3. Fig. 5 is a cross section on line V—V of Fig. 3. Fig. 6 is a broken side elevation of the outer casing or drum of the scale.

In the drawings, 1 designates a frame inclosed in a stationary drum 2, having sight openings 2ª and an indicator 2ᵇ.

3 designates a pair of balancing springs suspended from the frame by a pair of screws 4 and secured at their lower ends to a pair of connecting-bars 5. Said connecting-bars are pivotally secured at their lower ends to an equalizing-bar 6, provided with a depending hook 7 from which the pan (not shown) is suspended, or to which a platform may be connected, if the device be applied to a platform scale.

8 designates a graduated cylinder which is inclosed within the drum and suitably mounted upon the upper portion of a vertical shaft 9 journaled in frame 1 and a bracket 10.

11 designates a bevel gear fixed to the lower end of shaft 9 and intermeshing with a bevel gear 12 fixed upon a shaft 13 carrying a pinion 14 also fixed thereto.

15 designates a connecting-bar provided at its upper portion with rack-teeth 16 which intermesh with and actuate the pinion 14.

The foregoing mechanism is of the usual construction, and hence further detailed description of its construction and operation is deemed unnecessary.

I will now proceed to describe in detail the compensating device forming the important feature of my invention, and which, in the present instance, I have shown interposed between the lower end of the connecting-bar 15 and the equalizing bar 6, although I wish it understood that I do not limit myself to this exact location, as it is obvious that said compensating device may be applied to other parts of the weighing mechanism to take up the lost motion therein.

17 designates an externally-threaded tubular member, in which the lower end of the connecting-rod 15 loosely fits, said connecting-rod being held in place by a transverse pin 18 extending therethrough and projecting through oppositely-disposed longitudinal slots 19 in the sides of the tubular member 17, see Figs. 3 to 5, inclusive. The projecting ends of pin 18 are engaged by an internally-threaded nut 20, adjustably-engaging the external threads of member 17. Nut 20 is provided at its lower end with a peripheral shoulder 21, whereby it may be readily rotated, and containing an annular groove 22 in which the projecting ends of the pin 18 loosely fit so that the nut may be rotated without turning the pin therewith. Pin 18 is placed in position in the nut through either of openings 22ª, communicating with groove 22.

23 designates an expansion spring interposed between the lower terminal of the connecting-rod 15 and the bottom of member 17. Member 17 is provided at its lower end with a laterally-extending arm 24 pivotally-secured by a pin 25 to a bifurcated member 26 fixed to the upper side of the equalizing bar 6, see Fig. 1.

By referring to Fig. 2, it will be noted that the pivotal point 25 is at the rear of the connecting-bar 15. This location of the pivotal-point is adopted for the purpose of throwing the weight of the connecting-bar 15 forward so that its rack-teeth 16 will remain in mesh with pinion 14 without employing other means to hold said teeth in mesh, which means would create more or less friction and thus tend to restrain the operation of the weighing mechanism.

In order to adjust the graduated cylinder to bring its zero character in coincidence with the indicator $a\,b$ on the drum (as shown in Fig. 6) when the weighing mechanism is at rest, the adjusting-nut 20 is either adjusted upward or downward to raise or lower the connecting-bar 15, and through the intermediate mechanism turn the graduated cylinder to the proper point. After said adjustment has been effected to obtain accuracy in weighing, any inaccuracy due to lost motion between the connecting-rod 15 and its connection with the equalizing-bar 6 is obviated by my compensating device, the spring 23 of which pressing upward on nut 20, through the intermediacy of connecting-rod 15 and pin 18, takes up any lost motion which may exist between the threads of the nut and the threads of member 17, also obviates accidental turning of the nut 20.

From the foregoing it will be understood that the connecting-bar 15 will always be held in proper relation to the equalizing bar 6 by my compensating device, after proper adjustment has been once effected, and hence all inaccuracy due to accidental adjustment of said bar 15 is overcome.

Having thus described my invention, what I claim is:—

1. The combination with the weighing mechanism of a scale, of a compensating device consisting of an externally-threaded tubular member adjustably-engaging two parts of said weighing mechanism, means interposed between one of said parts and said member tending to force them in opposite directions, a second member internally-threaded to adjustably-engage the first member, and means connecting said second member to one of the parts of the weighing mechanism.

2. The combination with the weighing mechanism of a scale, of a compensating device consisting of a member adjustably-connecting two parts of said weighing mechanism, expansive means interposed between one of said parts and said member tending to force them in opposite directions, a second member adjustably-engaging the first-member and having an annular groove, and a pin extending through one of the parts of the weighing mechanism and projecting into said annular groove, said pin extending loosely through the first member.

3. The combination with the weighing mechanism of a scale, of a compensating device consisting of an externally-threaded tubular member adjustably-connecting two parts of said weighing mechanism and provided with oppositely-disposed slots, a spring interposed between one of said parts and said member tending to force them in opposite direction, a second member internally-threaded to engage the threads of the first member and provided with an annular groove, and a pin extending through one of the weighing mechanism parts and the slots in the first member and projecting into the annular groove of the second member.

4. The combination with the weighing mechanism of a scale including a pinion, a rack-bar having teeth intermeshing with said pinion, and an equalizing-bar; of a compensating device adjustably-connecting the equalizing-bar and the rack-bar, said compensating device having a rearwardly-extending arm pivotally-connected to the equalizing bar at a point in the rear of the rack-bar.

In testimony whereof I affix my signature, in the presence of two witnesses.

HARRY B. SHERWOOD.

Witnesses:
F. G. FISCHER,
M. COX.